United States Patent
Hsiao et al.

(10) Patent No.: US 12,348,049 B2
(45) Date of Patent: Jul. 1, 2025

(54) WIRELESS CHARGER OF VEHICLE

(71) Applicants: Inventec (Pudong) Technology Corporation, Shanghai (CN); INVENTEC CORPORATION, Taipei (TW)

(72) Inventors: Chi-Cheng Hsiao, Taipei (TW); Ming-Hung Shih, Taipei (TW); Ying-Chao Peng, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 737 days.

(21) Appl. No.: 17/715,105

(22) Filed: Apr. 7, 2022

(65) Prior Publication Data
US 2023/0275459 A1    Aug. 31, 2023

(30) Foreign Application Priority Data
Feb. 25, 2022 (CN) .............................. 202210178616

(51) Int. Cl.
*H01M 10/46* (2006.01)
*H02J 7/00* (2006.01)
(Continued)

(52) U.S. Cl.
CPC .......... *H02J 50/005* (2020.01); *H02J 7/0044* (2013.01); *H02J 50/402* (2020.01); *H02J 7/00309* (2020.01)

(58) Field of Classification Search
CPC .... H02J 7/0042; H02J 7/0044; H02J 7/00309; H02J 50/005; H02J 50/402; B60H 1/00271; H05K 7/20909
(Continued)

(56) References Cited

U.S. PATENT DOCUMENTS

| | | | |
|---|---|---|---|
| 2014/0007594 A1* | 1/2014 | Lofy .................. | H05K 7/20209 62/3.2 |
| 2019/0014683 A1* | 1/2019 | Han ........................ | H02J 50/10 |

(Continued)

FOREIGN PATENT DOCUMENTS

| | | | | |
|---|---|---|---|---|
| CN | 104471508 B | * | 7/2019 | .............. H02J 50/10 |
| CN | 210430946 U | * | 4/2020 | ............ H02J 7/0042 |

(Continued)

*Primary Examiner* — Edward Tso
(74) *Attorney, Agent, or Firm* — troutman pepper locke; Tim Tingkang Xia, Esq.

(57) ABSTRACT

A wireless charger is configured to charge a mobile device and be connected to an air conditioner. The wireless charger includes a casing, a wireless charging module, and a valve assembly. The casing includes a first accommodation space, a second accommodation space, and an air inlet. The first accommodation space is in fluid communication with the second accommodation space, the first accommodation space is configured to accommodate the mobile device, and the air inlet is in fluid communication with the first accommodation space and the second accommodation space. The wireless charging module is located in the second accommodation space and configured to charge the mobile device. The valve assembly is mounted to the air inlet and configured to be connected to the air conditioner.

9 Claims, 6 Drawing Sheets

(51) Int. Cl.
*H02J 50/00* (2016.01)
*H02J 50/40* (2016.01)

(58) Field of Classification Search
USPC ............... 320/107, 108, 114, 115, 150, 153
See application file for complete search history.

(56) References Cited

U.S. PATENT DOCUMENTS

2020/0201402 A1* 6/2020 Lee ........................ G06F 1/20
2022/0256732 A1* 8/2022 Wu ..................... H02J 7/0044

FOREIGN PATENT DOCUMENTS

| CN | 212323769 U | * | 1/2021 | |
|---|---|---|---|---|
| EP | 4027479 B1 | * | 7/2024 | ............. H02J 50/00 |
| KR | 102414050 B1 | * | 6/2022 | |
| WO | WO-2019136692 A1 | * | 7/2019 | |
| WO | WO-2021129443 A1 | * | 7/2021 | ........... H01F 27/025 |
| WO | WO-2023155631 A1 | * | 8/2023 | |

* cited by examiner

WIRELESS CHARGER OF VEHICLE

CROSS-REFERENCE TO RELATED APPLICATIONS

This non-provisional application claims priority under 35 U.S.C. § 119(a) on Patent Application No(s). 202210178616.2 filed in China, on Feb. 25, 2022, the entire contents of which are hereby incorporated by reference.

BACKGROUND OF THE INVENTION

Technical Field of the Invention

The invention relates to a wireless charger, more particularly to a wireless charger having a valve assembly.

Description of the Related Art

As the development and progress of technology, mobile devices such as smart phones or tablet computers can be connected to the vehicle system through programs (e.g., CarPlay). In order to let users not to worry about the power consumption of mobile devices, the wireless charger is further applied to the vehicle so that the mobile devices can be connected to the vehicle system through the programs while placed on the wireless charger for charging.

When a mobile device is placed on a wireless charger for charging, the wireless charger generates heat, and the mobile device also generates heat while its program is running. Under the influence of these two kinds of heat, the operation of the mobile device may be adversely affected. Therefore, how to solve the aforementioned issue is one of the crucial topics in this field.

SUMMARY OF THE INVENTION

The invention provides a wireless charger which is capable of preventing heat generated therefrom and heat generated from the mobile device from adversely affecting the operation of the mobile device.

One embodiment of the invention provides a wireless charger. The wireless charger is configured to charge a mobile device and be connected to an air conditioner. The wireless charger includes a casing, a wireless charging module, and a valve assembly. The casing includes a first accommodation space, a second accommodation space, and an air inlet. The first accommodation space is in fluid communication with the second accommodation space, the first accommodation space is configured to accommodate the mobile device, and the air inlet is in fluid communication with the first accommodation space and the second accommodation space. The wireless charging module is located in the second accommodation space and configured to charge the mobile device. The valve assembly is mounted to the air inlet and configured to be connected to the air conditioner.

According to the wireless charger as discussed in the above embodiment, the valve assembly is mounted to the air inlet and connected to the air conditioner, such that the valve assembly can control the air that the air conditioner blows into the first accommodation space and the second accommodation space to regulate the temperature of the mobile device.

Therefore, the mobile device can operate in a proper temperature.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
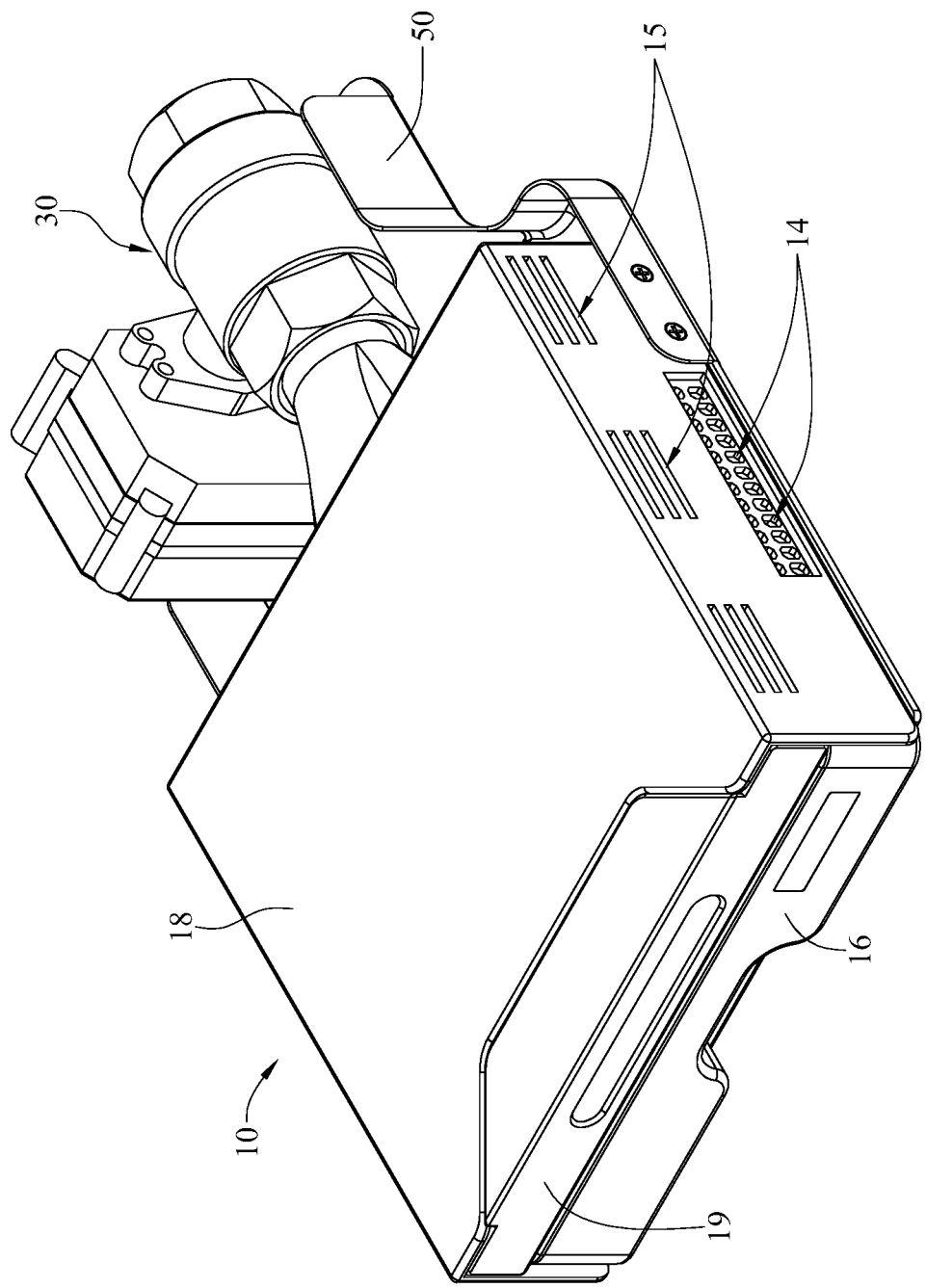
FIG. 1 is a perspective view of a wireless charger according to one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present invention, such as technical and scientific terms, have its own meanings and can be comprehended by those skilled in the art, unless the terms are additionally defined in the present invention. That is, the terms used in the following paragraphs should be read on the meaning commonly used in the related fields and will not be overly explained, unless the terms have a specific meaning in the present invention.

Figure 2:
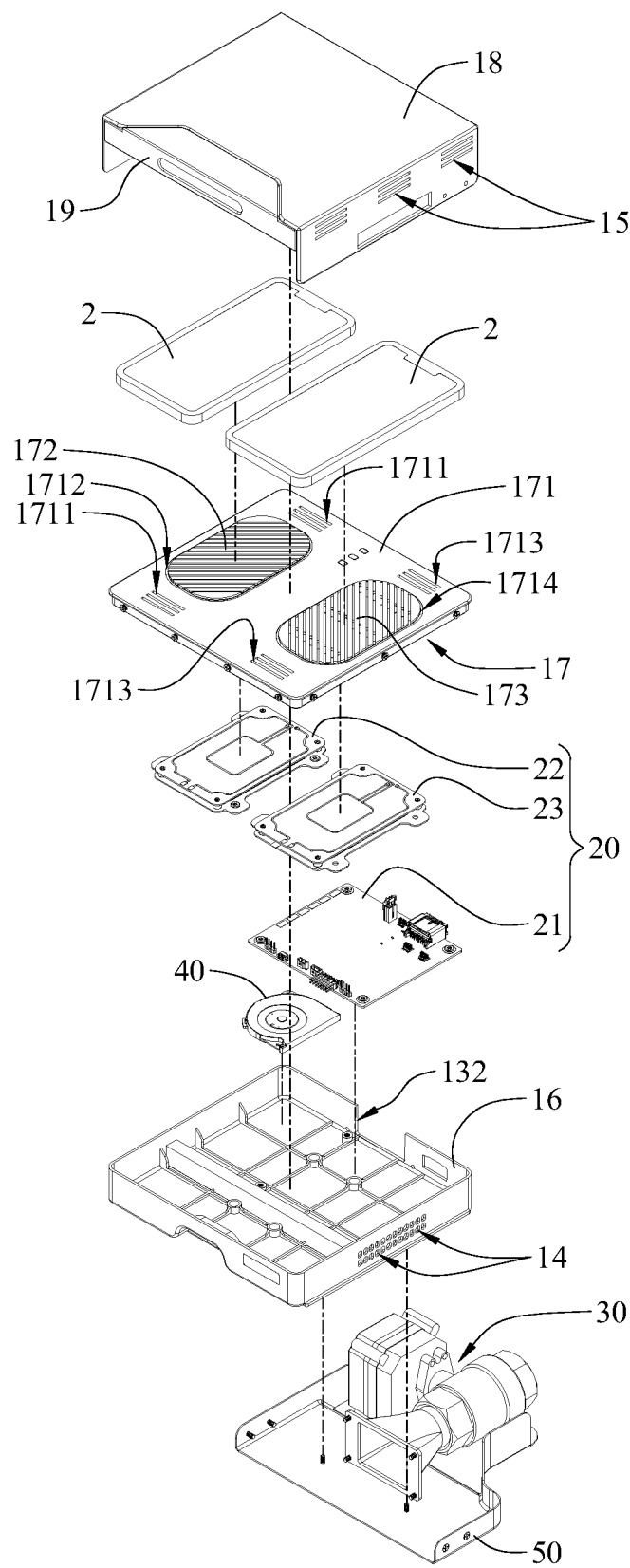
FIG. 2 is an exploded view of the wireless charger in FIG. 1.
Figure 3:
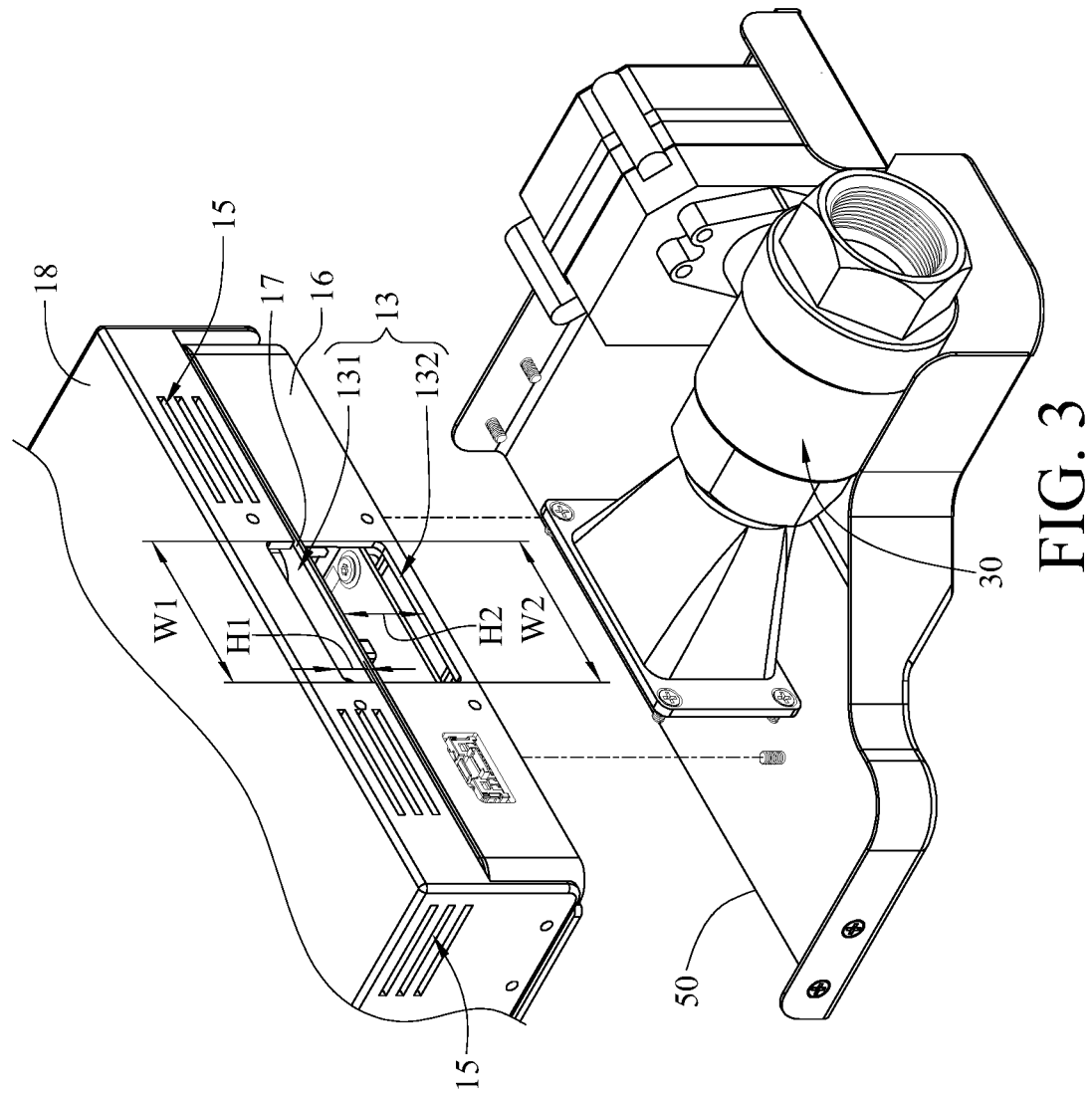
FIG. 3 is a partial exploded view of the wireless charger in FIG. 1.
Figure 4:
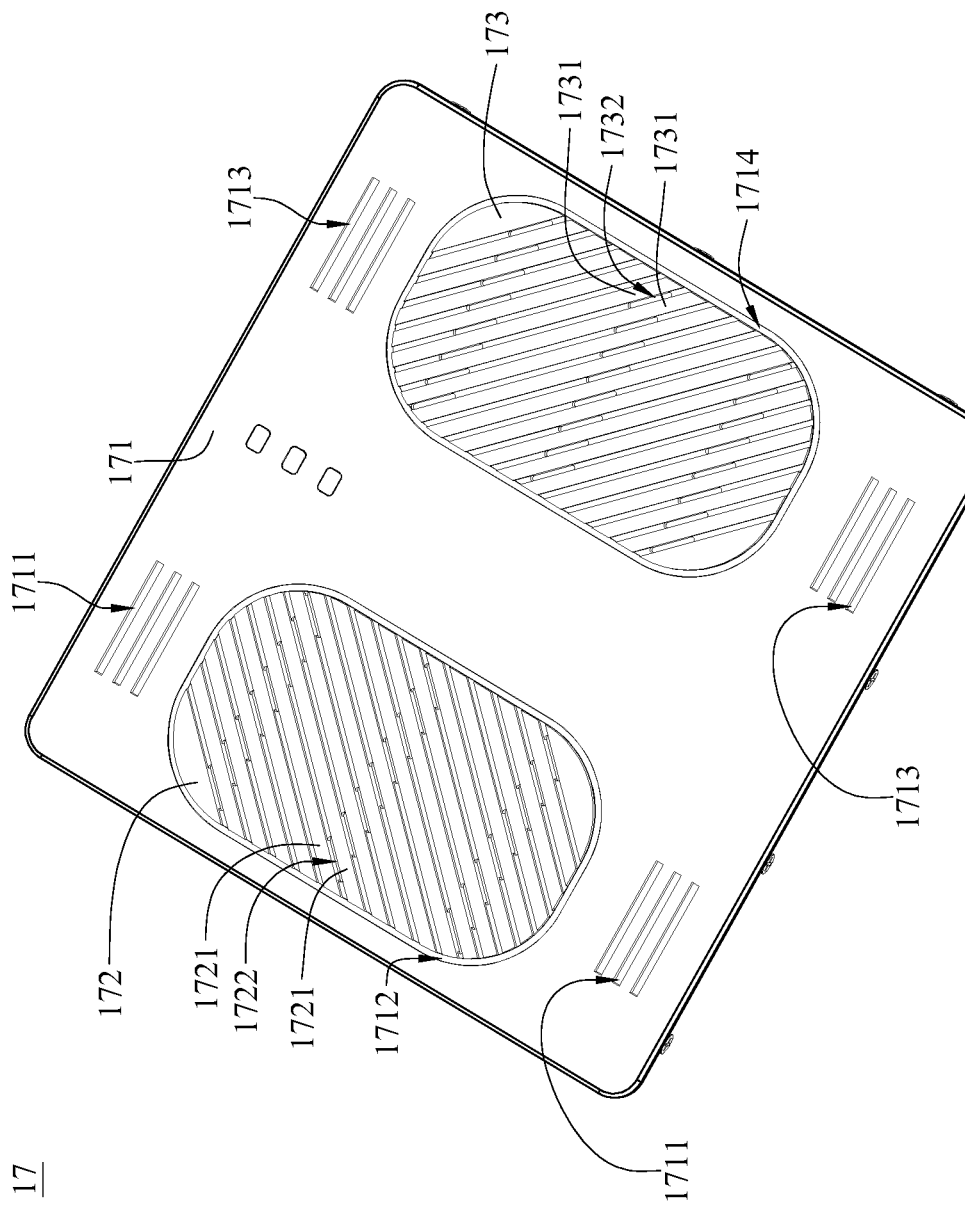
FIG. 4 is a perspective view of a support plate in FIG. 2.
Figure 5:
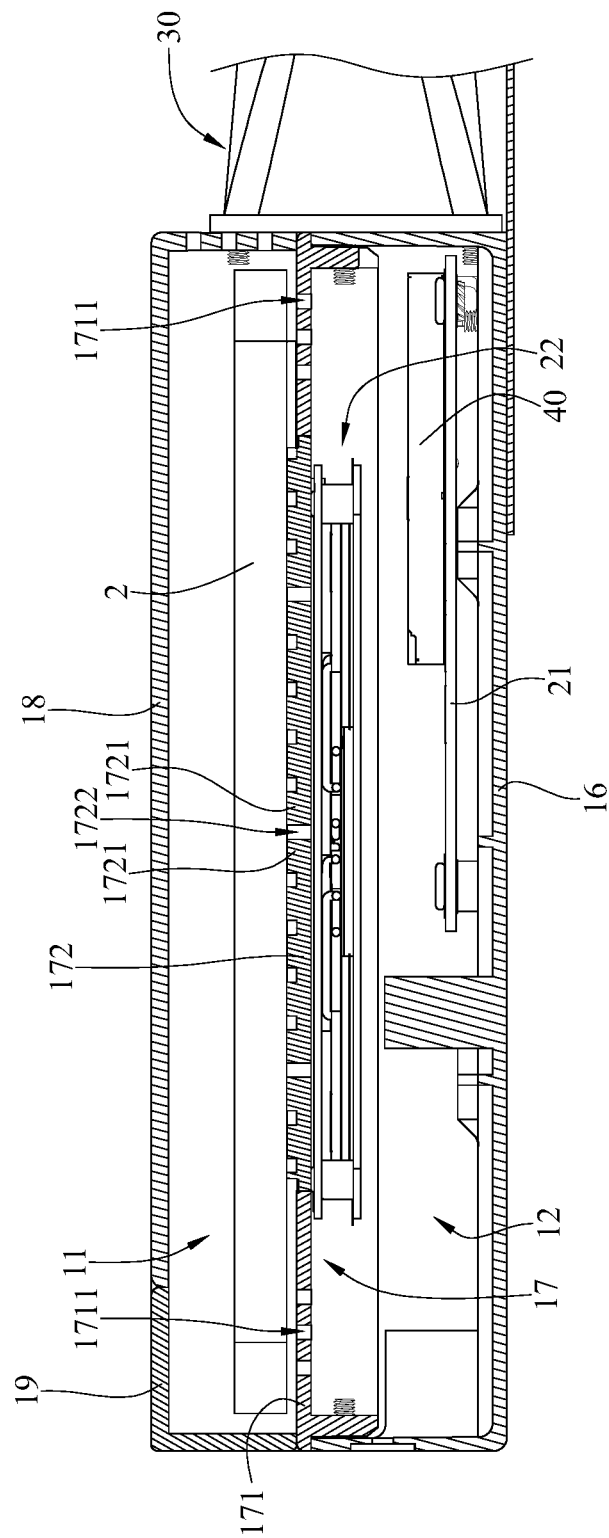
FIG. 5 is a cross-sectional view of the wireless charger in FIG. 1.
Figure 6:
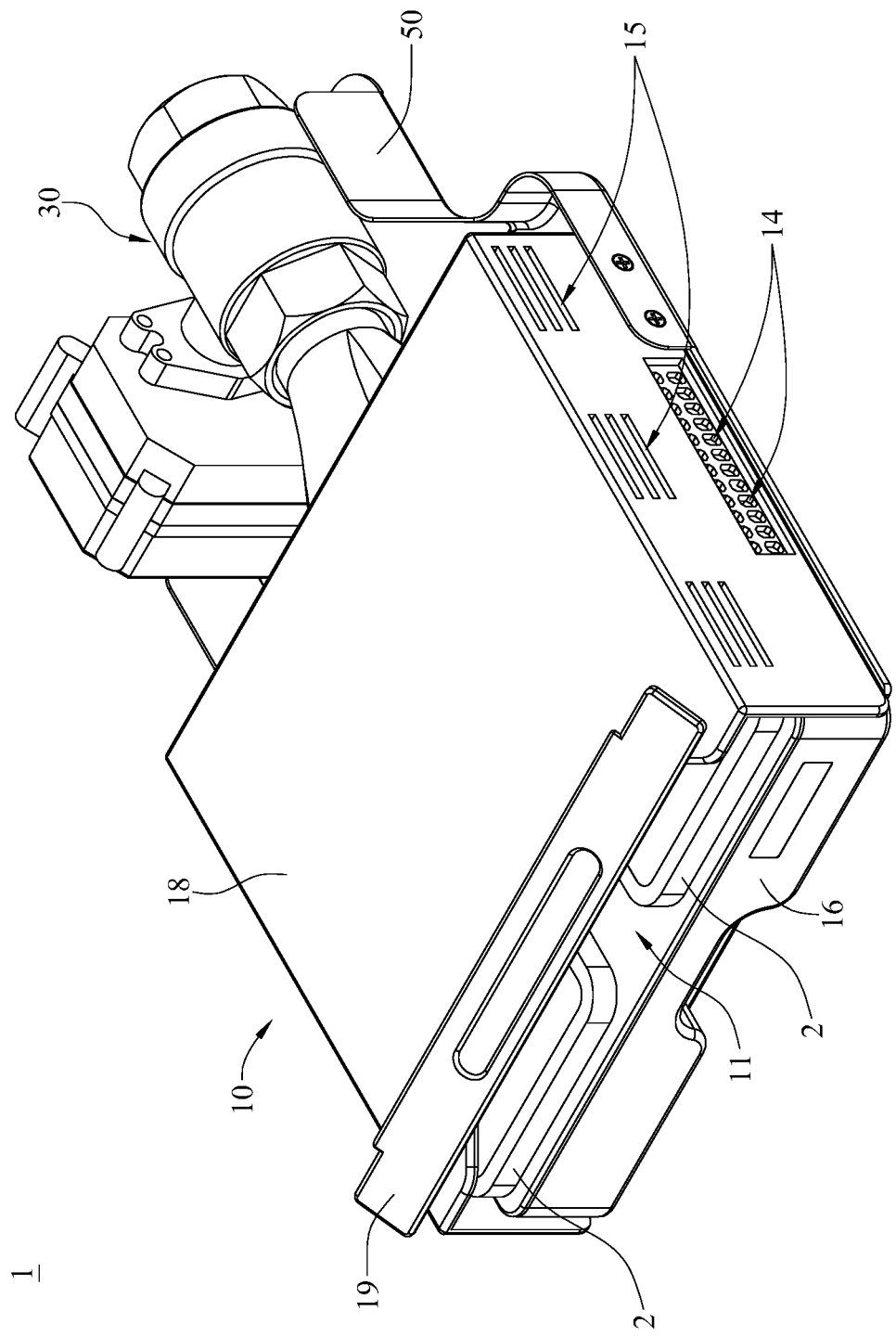
FIG. 6 is a perspective view of the wireless charger in FIG. 1 when a flip cover is opened.

Referring to FIGS. 1 to 6, FIG. 1 is a perspective view of a wireless charger 1 according to one embodiment of the invention, FIG. 2 is an exploded view of the wireless charger 1 in FIG. 1, FIG. 3 is a partial exploded view of the wireless charger 1 in FIG. 1, FIG. 4 is a perspective view of a support plate 17 in FIG. 2, FIG. 5 is a cross-sectional view of the wireless charger 1 in FIG. 1, and FIG. 6 is a perspective view of the wireless charger 1 in FIG. 1 when a flip cover 19 is opened.

In this embodiment, the wireless charger 1 is, for example, configured to be mounted to a center console of a vehicle. The wireless charger 1 is configured to charge at least one mobile device 2 and be connected to an air conditioner (not shown).

The wireless charger 1 includes a casing 10, a wireless charging module 20, and a valve assembly 30.

The casing 10 includes a first accommodation space 11, a second accommodation space 12, an air inlet 13, an air outlet 14, and a plurality of vent holes 15. The first accommodation space 11 is in fluid communication with the second accommodation space 12. The first accommodation space 11 is configured to accommodate two mobile devices 2.

The air inlet 13 includes a first portion 131 and a second portion 132. The first portion 131 and the second portion 132 are respectively and directly in fluid communication with the first accommodation space 11 and the second accommodation space 12. A size of the first portion 131 is smaller than a size of the second portion 132. For example, a width W1 of the first portion 131 is equal to a width W2 of the second portion 132, and a height H1 of the first portion 131 is smaller than a height H2 of the second portion 132. The vent holes 15 are, for example, directly in fluid communication with the first accommodation space 11.

The following paragraphs will further introduce the casing 10. The casing 10 includes a bottom base 16, a support plate 17, a top cover 18, and a flip cover 19. The support plate 17 is mounted on the bottom base 16, and the support plate 17 and the bottom base 16 together form the second accommodation space 12. The top cover 18 covers the bottom base 16 and the support plate 17, and the top cover 18 and the support plate 17 together form the first accommodation space 11.

The support plate 17 includes a main body 171, a first pad 172, and a second pad 173. The main body 171 is, for example, made of plastic material. The main body 171 includes a plurality of first communication holes 1711, a first mount hole 1712, a plurality of second communication holes 1713, and a second mount hole 1714. The first mount hole 1712 is located between some of the first communication holes 1711 and the other first communication holes 1711, and the second mount hole 1714 is located between some of the second communication holes 1713 and the other second communication holes 1713. The first mount hole 1712 and the first communication holes 1711 are arranged along a straight line, and the second mount hole 1714 and the second communication holes 1713 are arranged along another straight line, where the two straight lines are, for example, parallel to each other.

The first pad 172 and the second pad 173 are, for example, made of rubber. The first pad 172 and the second pad 173 are respectively disposed in the first mount hole 1712 and the second mount hole 1714 of the main body 171. The first pad 172 has a plurality of first protrusions 1721 and a plurality of third communication holes 1722. The first protrusions 1721 are arranged all over a surface of the first pad 172 facing the first accommodation space 11 and are inclined relative to each side of the main body 171. Each of the third communication holes 1722 is located between two of the first protrusions 1721 which are adjacent to each other. The second pad 173 has a plurality of second protrusions 1731 and a plurality of fourth communication holes 1732. The second protrusions 1731 are arranged all over a surface of the second pad 173 facing the first accommodation space 11 and are inclined relative to each side of the main body 171. Each of the fourth communication holes 1732 is located between two of the second protrusions 1731 which are adjacent to each other.

In this embodiment, the first accommodation space 11 is in fluid communication with the second accommodation space 12 via the first communication holes 1711 and the second communication holes 1713 of the main body 171, the third communication holes 1722 of the first pad 172, and the fourth communication holes 1732 of the second pad 173.

As shown in FIG. 4, when the mobile device 2 is accommodated in the first accommodation space 11 and placed on the support plate 17, the first protrusions 1721 support the mobile device 2, such that the mobile device 2 is spaced apart from the first communication holes 1711 and the third communication holes 1722. As shown in FIG. 4, the mobile device 2 is located above all of the first communication holes 1711 and all of the third communication holes 1722, and the first protrusions 1721 can prevent the mobile device 2 from blocking the first communication holes 1711 and the third communication holes 1722, thereby ensuring the fluid communication between the first accommodation space 11 and the second accommodation space 12. Similarly, when the mobile device 2 is accommodated in the first accommodation space 11 and supported by the second protrusions 1731, the second protrusions 1731 can also prevent the mobile device 2 from blocking the second communication holes 1713 and the fourth communication holes 1732, thereby ensuring the fluid communication between the first accommodation space 11 and the second accommodation space 12. The purpose of the fluid communication between the first accommodation space 11 and the second accommodation space 12 will be explained in the later paragraphs.

The first portion 131 and the second portion 132 of the air inlet 13 are respectively located at the top cover 18 and the bottom base 16. The air outlet 14 is located at the bottom base 16, and the air outlet 14 and the second portion 132 of the air inlet 13 are respectively located at two adjacent walls of the bottom base 16, and the vent holes 15 are located at the top cover 18.

The flip cover 19 is pivotally disposed on the top cover 18 so as to be pivotable between a closed position and an opened position. As shown in FIG. 1, the flip cover 19 is in the closed position, and the first accommodation space 11 and the mobile device 2 therein are covered by the flip cover 19. As shown in FIG. 5, the flip cover 19 can be pivoted from the closed position to the opened position. When the flip cover 19 is in the opened position, the first accommodation space 11 of the casing 10 is exposed to outside. At this moment, the mobile device 2 can be taken out from the first accommodation space 11 of the casing 10. On the other hand, in the case where the flip cover 19 is in the opened position, the mobile device 2 can be placed into the first accommodation space 11 of the casing 10.

Note that the flip cover 19 is optional and may be omitted in some other embodiments.

The wireless charging module 20 is accommodated in the second accommodation space 12 of the casing 10. The wireless charging module 20 includes a circuit board 21, a first coil assembly 22, and a second coil assembly 23. The circuit board 21 is electrically connected to the first coil assembly 22 and the second coil assembly 23. The first coil assembly 22 corresponds to the third communication holes 1722 of the support plate 17, and the second coil assembly 23 corresponds to the fourth communication holes 1732 of the support plate 17. The first coil assembly 22 and the second coil assembly 23 are respectively configured to charge two mobile devices 2. In this embodiment, there are temperature sensors (not shown) respectively disposed on the first coil assembly 22 and the second coil assembly 23.

Note that the quantity of the coil assemblies (e.g., the first coil assembly 22 and the second coil assembly 23) are not restricted in the invention; in some other embodiments, when the first accommodation space of the casing is merely able to accommodate one mobile device, the wireless charging module may include only one coil assembly.

In this embodiment, the wireless charger 1 may further include a fan 40. The fan 40 is, for example, a centrifugal fan. The fan 40 is disposed in the second accommodation space 12 of the casing 10. The fan 40 can suck air in the first accommodation space 11 from the first communication holes 1711, the second communication holes 1713, the third communication holes 1722, and the fourth communication holes 1732, and suck air in the second accommodation space 12, and then blow air out of the second accommodation space 12 from the air outlets 14.

The valve assembly 30 is mounted to the air inlet 13 of the casing 10, and the valve assembly is configured to be connected to the air conditioner. In this embodiment, the wireless charger 1 may further include a support 50. The support 50 is, for example, fixed to the bottom base 16 of the casing 10 and supports the valve assembly 30.

Note that the support 50 may be fixed to another part of the casing 10 according to actual requirements, and the support 50 is optional and may be omitted in some other embodiments.

In this embodiment, the valve assembly 30 is mounted to the air inlet 13 and connected to the air conditioner, such that the valve assembly 30 can control the air that the air conditioner blows into the first accommodation space 11 and the second accommodation space 12 to regulate the temperature of the mobile devices 2. Therefore, the mobile devices 2 can operate in a proper temperature.

For example, in a case where the temperature inside the vehicle is high and the air conditioner is set to blow cold air to cool the temperature inside the vehicle, when the temperature sensor senses that the temperature of the first coil assembly 22 or second coil assembly 23 is greater than a predetermined value, the valve assembly 30 is opened, such that the cold air provided by the air conditioner can flow into the first accommodation space 11 and the second accommodation space 12 from the air inlet 13. At this moment, the cold air entering into the first accommodation space 11 from the first portion 131 of the air inlet 13 flows around the mobile devices 2 so as to cool the mobile devices 2, thereby maintaining the operation of the mobile devices 2. At the same time, the cold air entering into the first accommodation space 11 is sucked by the fan 40 located in the second accommodation space 12 from the first communication holes 1711, the second communication holes 1713, the third communication holes 1722, and the fourth communication holes 1732, and then the fan 40 blow the cold air to cool the first coil assembly 22 and the second coil assembly 23. On the other hand, the cold air entering into the second accommodation space 12 from the second portion 132 of the air inlet 13 directly cools the first coil assembly 22 and the second coil assembly 23 for preventing the heat generated from the first coil assembly 22 and the second coil assembly 23 from adversely affecting the operation of the mobile devices 2.

Another case is that when the temperature inside the vehicle is too low, and the air condition is set to blow warm air to increase the temperature inside the vehicle, the valve is opened to allow the warm air to enter into the first accommodation space 11 for increasing the temperature of the mobile devices 2 so as to prevent the mobile devices 2 from being failure caused by the low temperature inside the vehicle. Once the temperature sensor senses that the temperature of the first coil assembly 22 or the second coil assembly 23 is greater than a predetermined value, the valve assembly 30 is closed so as to prevent the warm air from constantly increasing the temperature of the mobile devices 2, the first coil assembly 22, and the second coil assembly 23, thereby maintaining the operation of the mobile devices 2.

Accordingly, the valve assembly 30 can be switched open or closed according to the environment temperature inside the vehicle to timely conduct air provided by the air conditioner into the casing 10 for regulating the temperature of the mobile devices 2 and the wireless charging module 20.

In this embodiment, when two mobile devices 2 are placed on the support plate 17, the first protrusions 1721 of the first pad 172 and the second protrusions 1731 of the second pad 173 not only can ensure the fluid communication between the first accommodation space 11 and the second accommodation space 12 for allowing the air provided by the air conditioner to enter into the second accommodation space 12 from the first accommodation space 11, but also guide the air in the first accommodation space 11 to enter into the second accommodation space 12 via the third communication holes 1722 and the fourth communication holes 1732. In addition, the first protrusions 1721 of the first pad 172 and the second protrusions 1731 of the second pad 173 can prevent the mobile devices 2 thereon from being unwantedly moved.

Note that the first protrusions 1721 of the first pad 172 are not restricted to being arranged all over the surface of the first pad 172 facing the first accommodation space 11; in some other embodiments, the first protrusions of the first pad may be merely arranged on a part of the surface of the first pad facing the first accommodation space. Similarly, the second protrusions of the second pad may be merely arranged on a part of the surface of the second pad facing the first accommodation space.

In addition, the first protrusions 1721 of the first pad 172 are not restricted to being inclined relative to each side of the main body 171 the support plate 17; in some other embodiments, the first protrusions of the first pad may be perpendicular or parallel to one side of the main body of the support plate. Similarly, the second protrusions of the second pad may be perpendicular or parallel to one side of the main body of the support plate.

Also, the quantity of the first protrusions 1721 of the first pad 172 is not restricted and may be modified to be one in some other embodiments as long as the first protrusion of the first pad can ensure the fluid communication between the first accommodation space and the second accommodation space. Similarly, the quantity of the second protrusion of the second pad may be modified to be one.

Moreover, the arrangement of the first protrusions 1721 of the first pad 172 is not restricted in the invention; in some other embodiments, when the mobile device placed on the support plate is not located above all of the first communication holes and the third communication holes, the first protrusions of the first pad may be omitted, and the fluid communication between the first accommodation space and the second accommodation space may be still achieved by the first communication holes and the third communication holes that are not located below the mobile device. Similarly, when the mobile device placed on the support plate is not located above all of the second communication holes and the fourth communication holes, the second protrusions of the second pad may be omitted, and the fluid communication between the first accommodation space and the second accommodation space may be still achieved by the second communication holes and the fourth communication holes that are not located below the mobile device.

Note that the main body 171, the first pad 172, and the second pad 173 of the support plate 17 are not restricted to including the communication holes; in some other embodiments, among the main body, the first pad, and the second pad of the support plate, only the first pad and the second pad include the communication holes, or only the main body of the support plate include the communication holes.

In addition, the first accommodation space 11 of the casing 10 is not restricted to accommodating two mobile devices 2; in some other embodiments, the first accommodation space of the casing may merely accommodate one mobile device, and the main body may merely include one group of the communication holes (e.g., the first communication holes or third communication holes), and the support plate may merely include one pad (e.g., the first pad or the second pad).

Note that the first pad 172 and the second pad 173 are optional and may be omitted in some other embodiments. In such a case, the support plate is made of one single material.

Note that the air inlet 13 of the casing 10 is not restricted to being directly in fluid communication with the first accommodation space 11 and the second accommodation space 12; in some other embodiments, the air inlet of the casing may be only directly in fluid communication with the first accommodation space 11 or the second accommodation space 12.

According to the wireless charger as discussed in the above embodiment, the valve assembly is mounted to the air inlet and connected to the air conditioner, such that the valve assembly can control the air that the air conditioner blows into the first accommodation space and the second accommodation space to regulate the temperature of the mobile device. Therefore, the mobile device can operate in a proper temperature.

In one embodiment of the invention, the wireless charger may be applied in vehicle field, such as self-driving vehicle, electric vehicle, or semi-self-driving vehicle.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. A wireless charger, configured to charge a mobile device and be connected to an air conditioner, the wireless charger comprising:
   a casing, comprising a first accommodation space, a second accommodation space, and an air inlet, wherein the first accommodation space is in fluid communication with the second accommodation space, the first accommodation space is configured to accommodate the mobile device, and the air inlet is in fluid communication with the first accommodation space and the second accommodation space;
   a wireless charging module, located in the second accommodation space and configured to charge the mobile device; and
   a valve assembly, mounted to the air inlet and configured to be connected to the air conditioner;
   wherein the casing further comprises a bottom base, a support plate, and a top cover, the support plate is mounted on the bottom base, the support plate and the bottom base together form the second accommodation space, the top cover covers the bottom base and the support plate, the top cover and the support plate together form the first accommodation space, the support plate comprises a plurality of communication holes, the first accommodation space is in fluid communication with the second accommodation space via the plurality of communication holes, and different portions of the air inlet are respectively located at the bottom base and the top cover.

2. The wireless charger according to claim 1, wherein the air inlet comprises a first portion and a second portion, and the first portion and the second portion are respectively and directly in fluid communication with the first accommodation space and the second accommodation space.

3. The wireless charger according to claim 2, wherein a size of the first portion is smaller than a size of the second portion.

4. The wireless charger according to claim 1, further comprising a fan, wherein the fan is disposed in the second accommodation space, the casing further comprises a plurality of air outlets in fluid communication with the second accommodation space, and the fan is configured to blow air in the second accommodation space out of the second accommodation space through the plurality of air outlets.

5. The wireless charger according to claim 4, wherein the fan is a centrifugal fan.

6. The wireless charger according to claim 1, wherein the casing further comprises a flip cover, the flip cover is pivotally disposed on the top cover so as to expose or cover the first accommodation space.

7. The wireless charger according to claim 1, wherein the plurality of communication holes are configured to be located between the mobile device and the wireless charging module, the support plate further comprises at least one protrusion, the at least one protrusion is configured to support the mobile device so as to space the mobile device apart from the plurality of communication holes.

8. The wireless charger according to claim 7, wherein the at least one protrusion comprises a plurality of protrusions, each of the plurality of communication holes is located between two of the plurality of protrusions which are located adjacent to each other.

9. The wireless charger according to claim 1, further comprising a support, wherein the support is fixed to the casing and supports the valve assembly.

\* \* \* \* \*